United States Patent [19]

Makhijani

[11] 4,352,439

[45] Oct. 5, 1982

[54] APPARATUS FOR CLOSING THE DOOR OF A PRESSURE CHAMBER

[75] Inventor: Raju T. Makhijani, Erie, Pa.

[73] Assignee: American Sterilizer Company, Erie, Pa.

[21] Appl. No.: 253,254

[22] Filed: Apr. 13, 1981

[51] Int. Cl.³ ............................................. B65D 45/00
[52] U.S. Cl. .................................... 220/316; 220/347; 220/346; 422/307
[58] Field of Search .............. 220/316, 345, 346, 347; 21/96, 98, 100; 292/21, 141, 465

[56] References Cited

U.S. PATENT DOCUMENTS 3,339,785 9/1967 Nugent ........................... 220/346 X
3,352,446 11/1967 Anderson et al. ............... 220/346 X
4,082,510 4/1978 Jovanovic ....................... 220/316 X

*Primary Examiner*—George T. Hall
*Attorney, Agent, or Firm*—Robert D. Yeager; Andrew J. Cornelius

[57] ABSTRACT

Apparatus secures in its closed position the door of a chamber capable of maintaining pressure within the chamber. The present invention includes apparatus disposed on the chamber for cooperating to move the door to and from its closed position including at least two members, one of which is movable relative to the chamber. The door is in its closed position when the stationary member and the door are separated from each other by a predetermined distance. The movable member can be forced between the door and the stationary member to separate the door and the stationary member from each other by a predetermined distance. Further, the present invention includes apparatus for preventing the door from assuming its closed position until the movable member is forced between the door and the stationary member.

6 Claims, 7 Drawing Figures

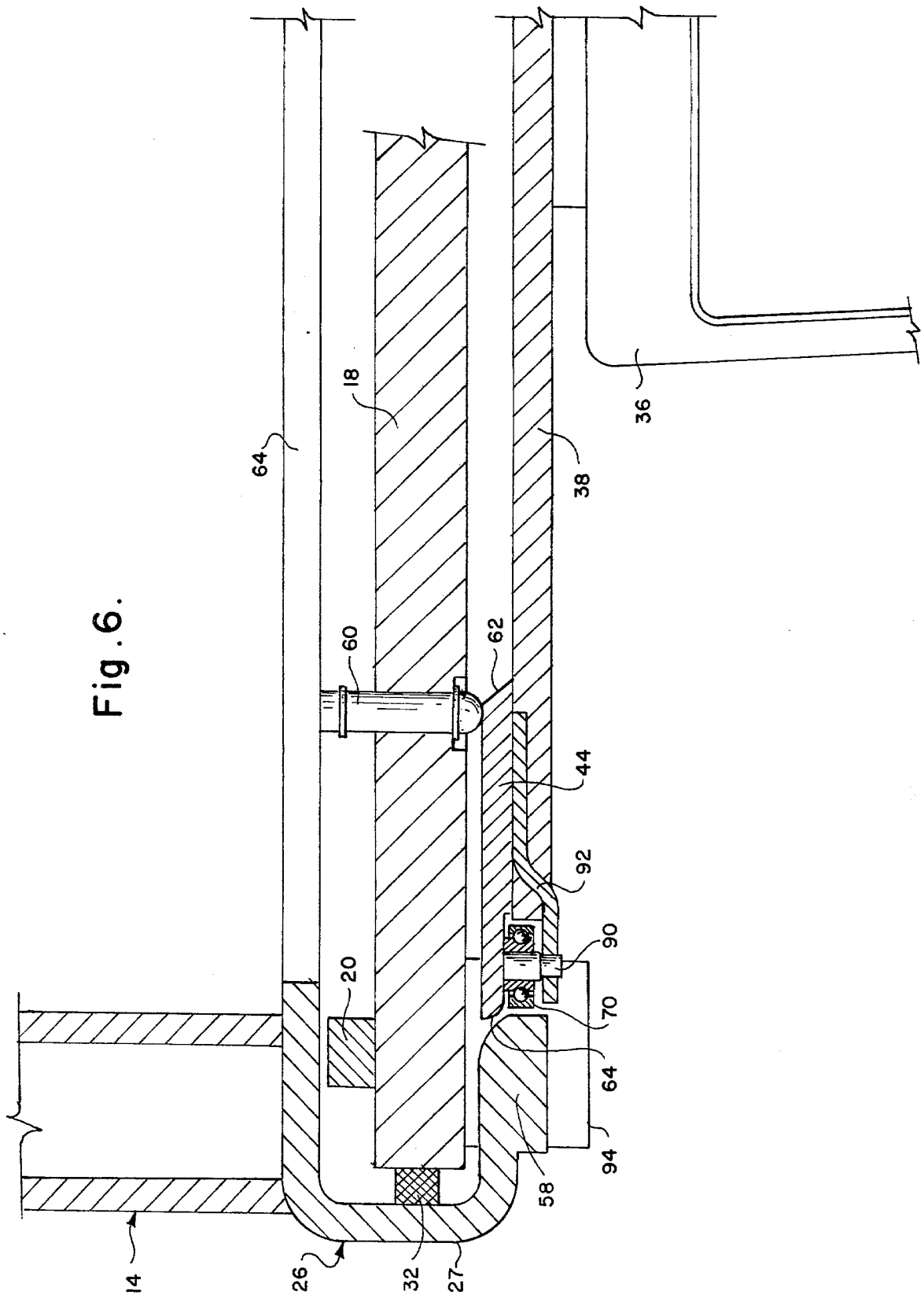

APPARATUS FOR CLOSING THE DOOR OF A PRESSURE CHAMBER

BACKGROUND OF THE INVENTION

1. Field of the Invention

The present invention relates to closures for chambers and, more particularly, to apparatus for moving the door of a chamber to and from its closed position.

2. Description of the Prior Art

There exists a wide variety of chambers adapted for maintaining pressure within the chamber. An example of such a chamber is a sterilizer that operates under pressure during at least a portion of the sterilizing cycle. To enable pressure to build within the chamber of the sterilizer, it is necessary to provide a seal against fluid flow from the chamber between the perimeter of the chamber opening and the door of the sterilizer. Typically, such a seal is effected by disposing a sealing device between the perimeter of the opening and the door. The sealing device is usually disposed on either the perimeter of the opening or the chamber door. Generally, one of two types of sealing devices is used to effect the fluid seal. The first, a compression seal, requires that compressive force be exerted on the seal by the door and the perimeter of the opening to the chamber. The second type of seal, a noncompressive seal, does not require the exertion of such a compressive force, but requires only that the seal contact the surfaces of both the perimeter of the opening and the door.

Moreover, for reasons related to personnel safety, it is necessary to ensure that a buildup of pressure cannot be established inadvertently within the chamber of a sterilizer.

Conventional closures for such sterilizers generally comprise a cluster of radial arms or bolts which are attached to a circular hub upon which a threaded nut is mounted. The nut travels along a threaded door post which is mounted on the door plate. The door is closed tightly against the chamber by rotating through several revolutions a handwheel that is mounted on the threaded nut to push the door post and door against the perimeter of the chamber opening. Such conventional closures are bulky and expensive to manufacture; further, the operator must use both hands to exert sufficient force on the handwheel to close a sterilizer door. Use of such conventional closures consumes a relatively long period of time since the operator must rotate the wheel completely several times to close the door.

Accordingly, there exists a need for apparatus for closing the door of a chamber capable of maintaining pressure within the chamber, such as a sterilizer, that can be operated quickly by one hand and with relatively little force and that prevents a user from inadvertently causing pressure to build within the sterilizer.

Fraser U.S. Pat. No. 272,873, issued on Feb. 27, 1883, and Kerr U.S. Pat. No. 2,481,429, issued on Sept. 6, 1949, disclose closures for openings. Although those closures employ some features of the present invention, they lack several features critical to the operation of the present invention.

SUMMARY OF THE INVENTION

The present invention provides apparatus for closing the door of a chamber capable of maintaining a positive pressure within the chamber. The present invention can be used with doors mounted in a variety of ways, including doors mounted for sliding or swinging movement. The present invention includes an operator for moving the door among its closed position—in which pressure can be maintained within the chamber—its partially closed position—in which access cannot be had to the interior of the chamber through the chamber opening but in which pressure cannot be maintained within the chamber—and its open position—in which access can be had through the chamber opening to the interior of the chamber and in which pressure cannot be maintained within the chamber. Further, the present invention includes a guide disposed on the chamber for restricting movement of the door to that necessary for it to travel among its closed, partially closed and open positions. The present invention includes a member secured to the chamber that is stationary relative to the chamber and a member disposed on the chamber that is movable relative to the chamber door and capable of being forced by the operator between the door and the stationary member to effect a separation of the door and the stationary member from each other of a predetermined distance to move the door to its closed position. Apparatus is disposed on the chamber for preventing the door from moving from its partially closed position toward its closed position until the movable member is forced between the stationary member and the door.

Accordingly, the present invention is useful for enabling a user to close the door of a chamber quickly with one hand and with relatively little effort. Also, the present invention is useful for preventing the door of a chamber from leaving its closed position when a positive pressure of a minimum predetermined value exists within the chamber and for preventing an inadvertent buildup of pressure within the chamber.

Unless stated otherwise, apparatus referred to by the term "chamber", when used herein, shall include the door of the chamber.

BRIEF DESCRIPTION OF THE DRAWINGS

The following detailed description of the preferred embodiments can be understood better if reference is made to the accompanying drawings, in which:

FIG. 6 is a view showing the details of a portion of the closing apparatus shown in FIG. 1.

DETAILED DESCRIPTION OF THE PREFERRED EMBODIMENTS

The preferred embodiment of the present invention will be described below as the present invention is embodied in apparatus for closing the sliding door of a sterilizer.

Figure 2:
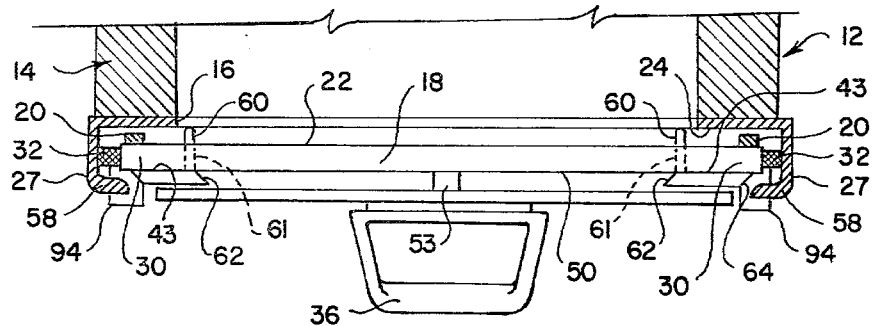
FIG. 2 is a top plan view, partly in section, of a portion of the sterilizer including the closing apparatus shown in FIG. 1.
Figure 1:
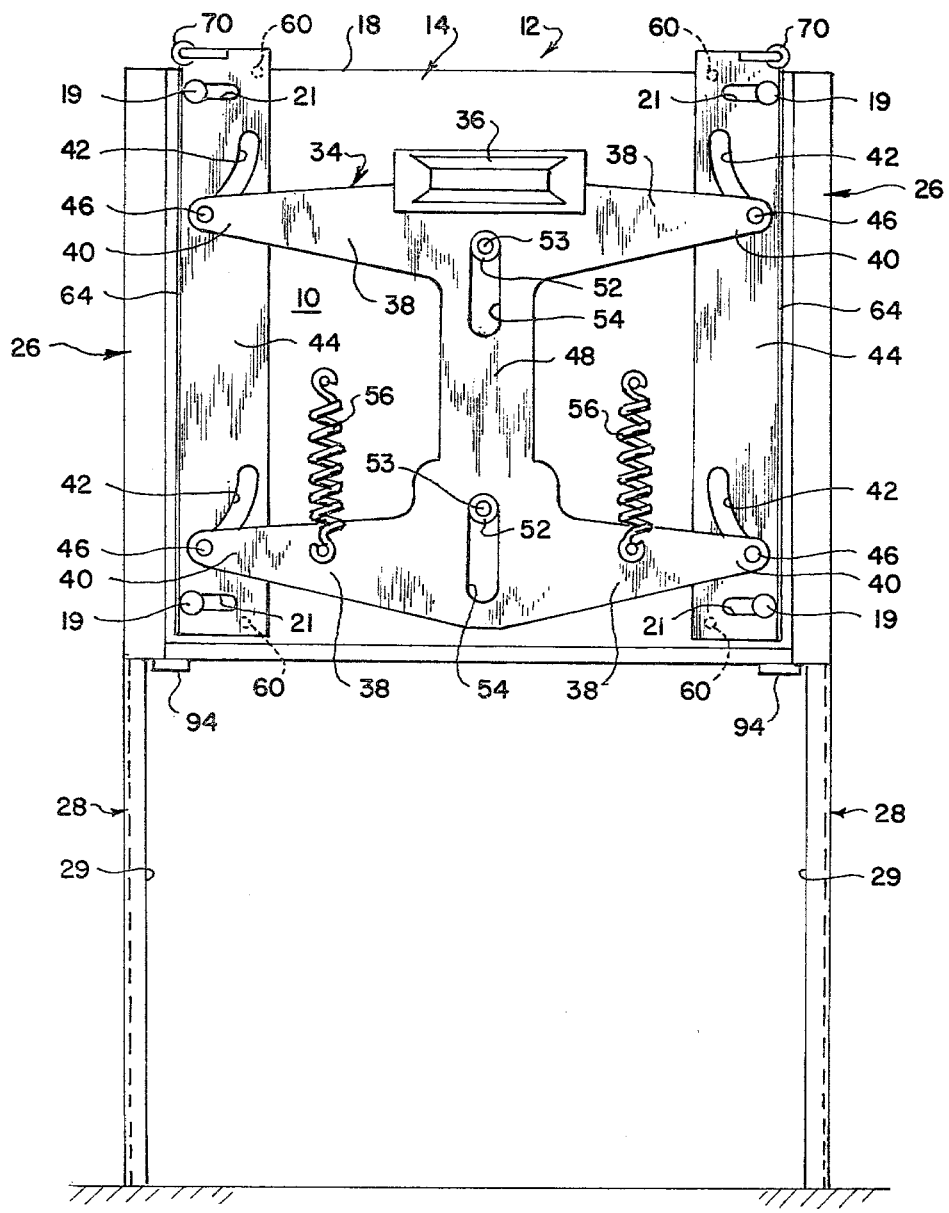
FIG. 1 is a side elevational view of a sterilizer having closing apparatus constructed according to the provisions of the present invention, the closing apparatus being in the partially closed position.
Figure 3:
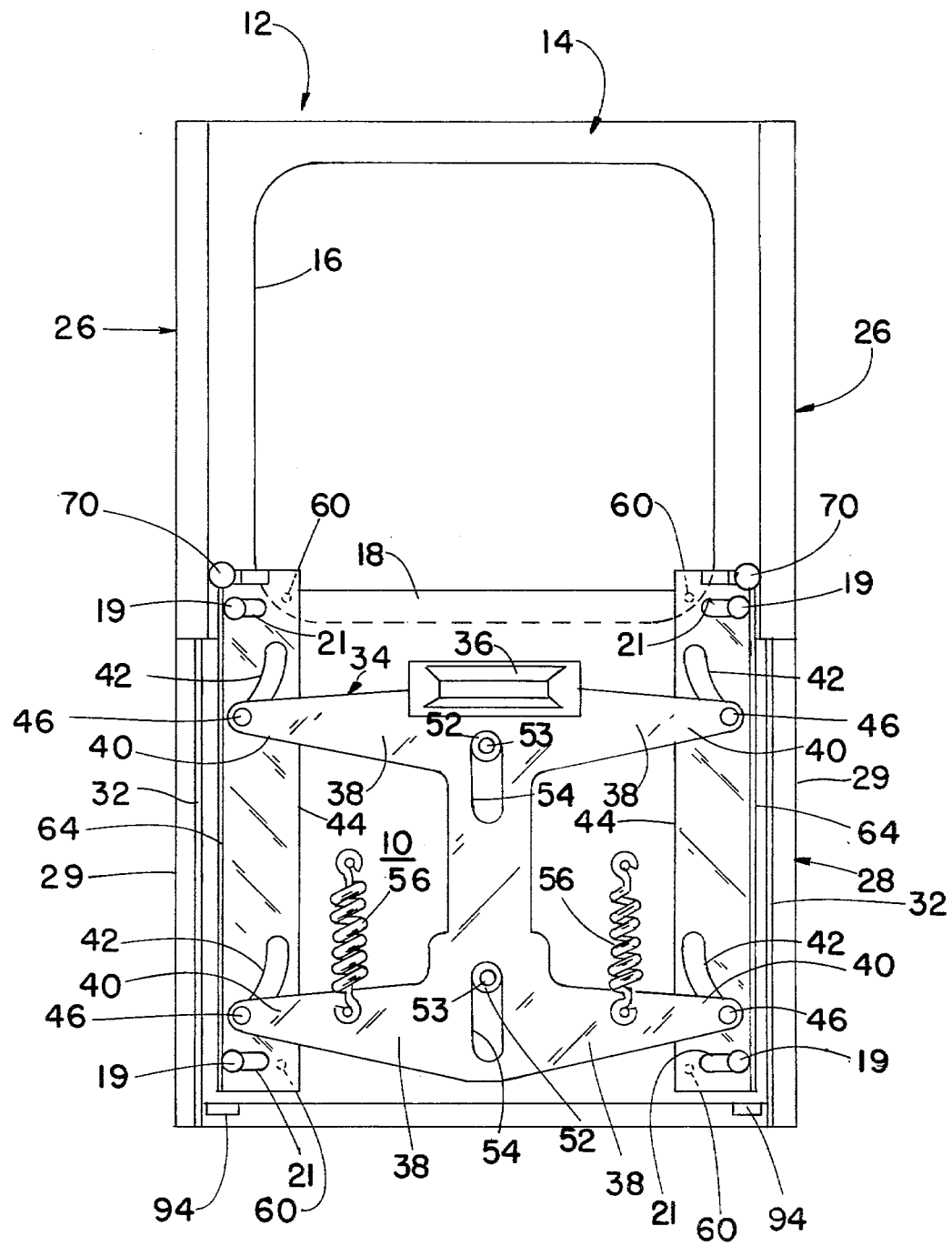
FIG. 3 is a front elevational view of the sterilizer shown in FIG. 1, but with the closing apparatus in its fully open position.
Figure 5:
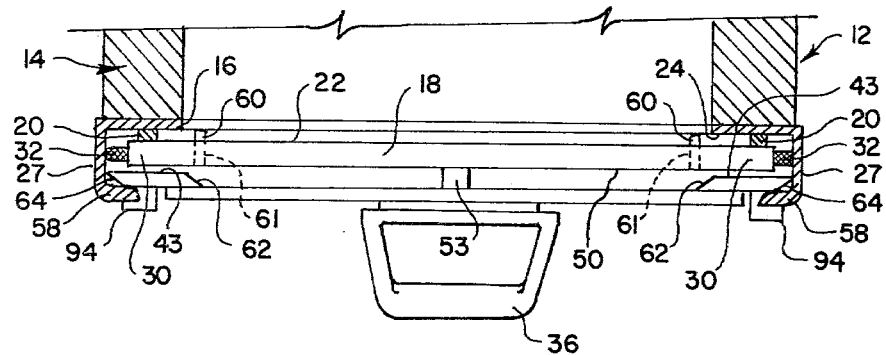
FIG. 5 is a top plan view of a portion of the sterilizer including the closing apparatus shown in FIG. 4.
Figure 4:
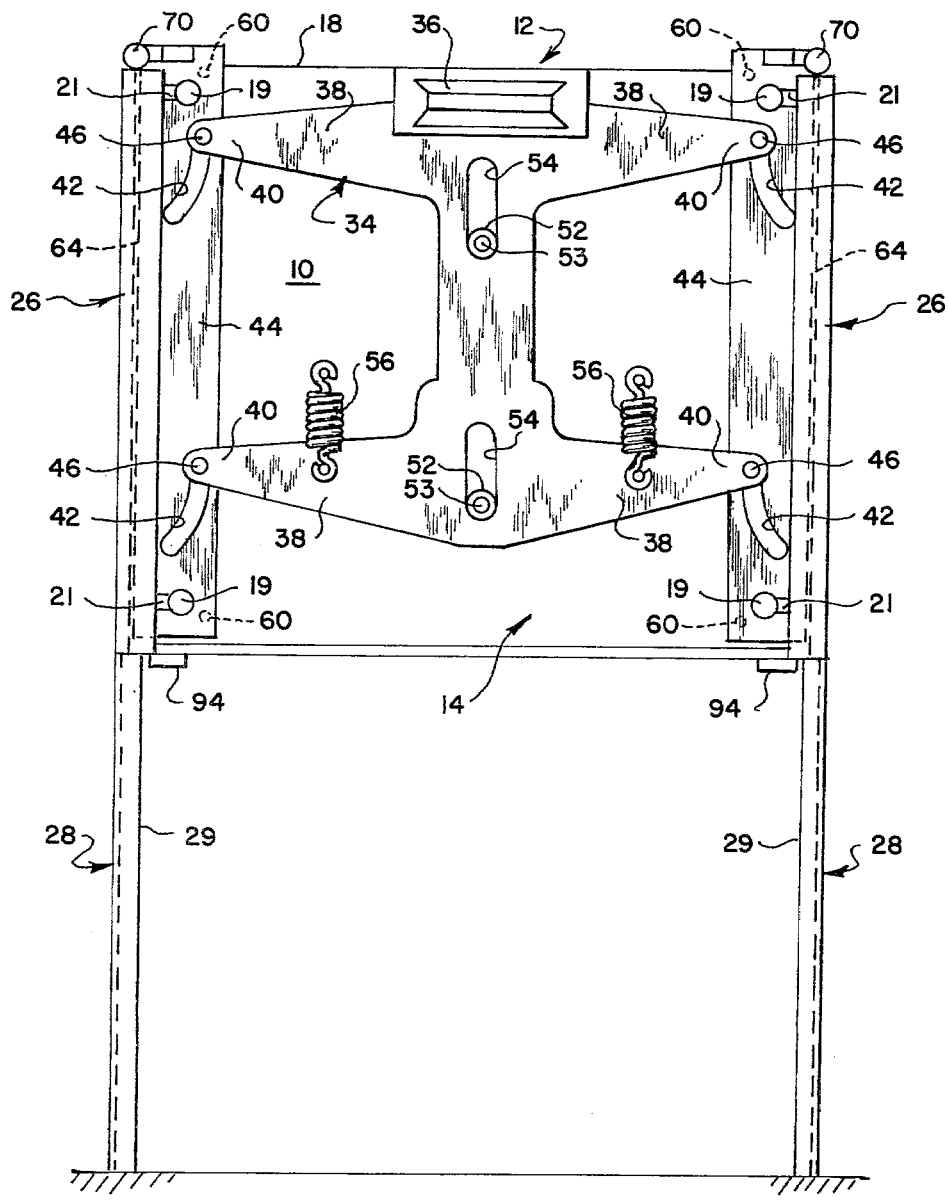
FIG. 4 is a front elevational view of the sterilizer shown in FIG. 1, but with the closing apparatus in its closed position.

FIGS. 1 through 5 show closing apparatus 10 and door 18 in various positions relative to sterilizer 12. Door 18 controls access to the interior of pressure chamber 14 through access opening 16. Closing apparatus 10 and door 18 can assume, generally, three positions relative to sterilizer 12. FIG. 3 shows closing apparatus 10 and door 18 in their fully open positions, in which access can be had to the interior of pressure chamber 14 through opening 16. FIG. 1 shows closing apparatus 10 and door 18 in their partially closed positions, in which access cannot be had to the interior of pressure chamber 14 through opening 16, but in which a buildup of pressure within chamber 14 is not possible. FIG. 4 shows closing apparatus 10 and door 18 in their closed positions, in which access to the interior of pressure chamber 14 cannot be had through opening 16 and in which a buildup of pressure within chamber 14 is possible. When closing apparatus 10 and door 18 are in the positions shown in FIG. 4, and pressure of a predetermined value exists within chamber 14, closing apparatus 10 cannot be operated to move door 18 from its closed position.

Sterilizer 12 includes a door 18 with a sealing device 20 secured by suitable means to interior surface 22 of door 18. Sealing device 20 can be any suitable seal, such as a compressive seal—which requires that door 18 exert a compressive force on the seal—or a noncompressive seal—which requires only that the seal engage both the perimeter 24 of opening 16 and inner surface 22 of door 18. An example of a noncompressive seal suitable for use with sterilizer 12 is described fully in U.S. patent application Ser. No. 221,425 of James A. Hopper, assigned to American Sterilizer Company, filed Dec. 30, 1980. If a compressive seal is used, door 18 is in its closed position when it exerts a force on sealing device 20 against perimeter 24 of opening 16 sufficient to effect a seal against the flow of fluid between perimeter 24 and door 18. If a noncompressive seal is used, door 18 is in its closed position when sealing device 20 contacts both perimeter 24 of opening 16 and door 18. As shown in FIGS. 1 and 2, closing apparatus 10 and door 18 are in their partially closed positions when inner surface 22 of door 18 is in a confronting relationship with opening 16 but is separated from perimeter 24 of opening 16.

Door 18 can be moved between its fully open position, shown in FIG. 3, and its partially closed position by sliding door 18 along upper guides 26 and lower guides 28. Movement of door 18 toward and away from opening 16 is limited by flanged members 27 of upper guides 26 or flanged members 29 of lower guides 28, depending on the position of door 18 relative to sterilizer 12. Ends 30 of door 18 include metallic spacer strips 32, which extend along the entire height of door 18 and prevent lateral movement of door 18 within flanged members 27 or 29. Lower guides 28 are secured to the bottom of pressure chamber 14 in any suitable manner and provide the additional function of supporting pressure chamber 14 at a distance from the surface upon which sterilizer 12 rests. Upper guides 26 can be formed integrally with the material comprising pressure chamber 14. Stops 94, secured to the lower edge of door 18, limit the upward vertical movement of door 18 when stops 94 engage the bottom edges of guides 26. It should be noted that if door 18 is mounted with hinges for swinging movement relative to sterilizer 12, lower guides 28 are not necessary and the guide 26 located near the side of chamber opening 16 opposite the hinges can be mounted to sterilizer 12 for hinged movement to permit movement of door 18.

Closing apparatus 10 includes an operator 34 having a handle 36 and extensions 38. Ends 40 of extensions 38 are mounted within cam openings 42 of cam members 44 with bearings 46. Center portion 48 of operator 34 is slidably secured to outer surface 50 of door 18 by bearings 52 which are mounted on posts 53 of door 18 and disposed within slots 54 of center portion 48 of operator 34. Accordingly, operator 34 can be moved vertically relative to door 18 a distance permitted by openings 42 and slots 54. Tension springs 56 counterbalance the weight of operator 34 to permit easy movement of operator 34 relative to door 18. Accordingly, door 18 can be moved between its fully open position and partially closed position by grasping handle 36 and exerting force vertically in the desired direction.

Closing apparatus 10 includes cam members 44 mounted on door 18 by bearings 19 mounted on door 18 and disposed in slots 21 for movement toward and away from ends 30 of door 18. When cam members 44 are forced between ends 58 of flanged members 27 and door 18, door 18 is urged toward perimeter 24 of opening 16 until sealing device 20 contacts perimeter 24 or is compressed between door 18 and perimeter 24. The magnitude of the force that cam members 44 exert on door 18 and sealing device 20 depends on whether a compressive or noncompressive seal is used. If a compressive seal is used, the force exerted by door 18 on sealing device 20 and perimeter 24 must be sufficient to provide a seal against the flow of fluid between perimeter 24 and door 18. If a noncompressive seal is used, sealing device 20 need only make contact with perimeter 24.

FIG. 6 shows most clearly the details of the apparatus that controls the separation between door 18 and opening 16. Closing apparatus 10 also includes four spacer pins 60 which maintain door 18 in its partially closed position when surface 43 of cam members 44 bear against ends 61 of the spacer pins 60. When cam members 44 are in such a position, spacer pins 60 protrude from inner surface 22 of door 18 and prevent sealing device 20 from making contact with the perimeter of opening 16. When surface 43 of cam members 44 do not bear against ends 61 of pins 60, and cam members 44 are forced between flanged ends 58 and door 18, spacer pins 60 can no longer prevent door 18 from moving toward perimeter 24 and, as described above, cam members 44 urge door 18 and sealing device 20 toward perimeter 24. Cam members 44 include beveled edges 62 and 64 to facilitate movement of cam members 44 over ends 61 of spacer pins 60 and between flanged ends 58 and door 18, respectively.

Cam members 44 are moved toward and away from ends 30 of door 18 with operator 34. When operator 34 is moved from its position shown in FIG. 1 to its position shown in FIG. 4, operator extension ends 40 travel within cam openings 42, force cam members 44 toward door ends 30 and, if operator 34 is moved vertically upward to the full upper limit of its movement, force cam members 44 between door 18 and flanged ends 58. As described above, surfaces 43 of cam members 44 disengage ends 61 of pins 60 and pins 60 permit door 18 to move toward perimeter 24 of opening 16. To move door 18 from its closed position to its partially closed position, operator 34 is moved from its position shown in FIG. 4 to its position shown in FIG. 1 by exerting a downward vertical force on operator 34. Operator extension ends 40 slide within cam openings 42 and pull cam members 44 away from door ends 30. If operator 34 is moved to its extreme lower limit, cam members 44 are withdrawn completely from between door 18 and flanged ends 58, surfaces 43 of cam members 44 engage ends 61 of pins 60, and cam members 44—along with door 18—are deflected away from opening 16.

Rollers 70 facilitate raising and lowering door 18 and prevent operator extension ends 40 from moving from their lower limits of travel to their upper limits of travel as operator 34 is used to raise door 18 from its completely open position to its partially closed position. Rollers 70 are secured to posts 90 mounted on the ends of cam members 44 with retainers 92. Rollers 70 also prevent outward movement of cam members 44 until door 18 reaches its position shown in FIG. 1 and rollers 70 are able to travel across the top surface of flanged members 27.

Figure 7:
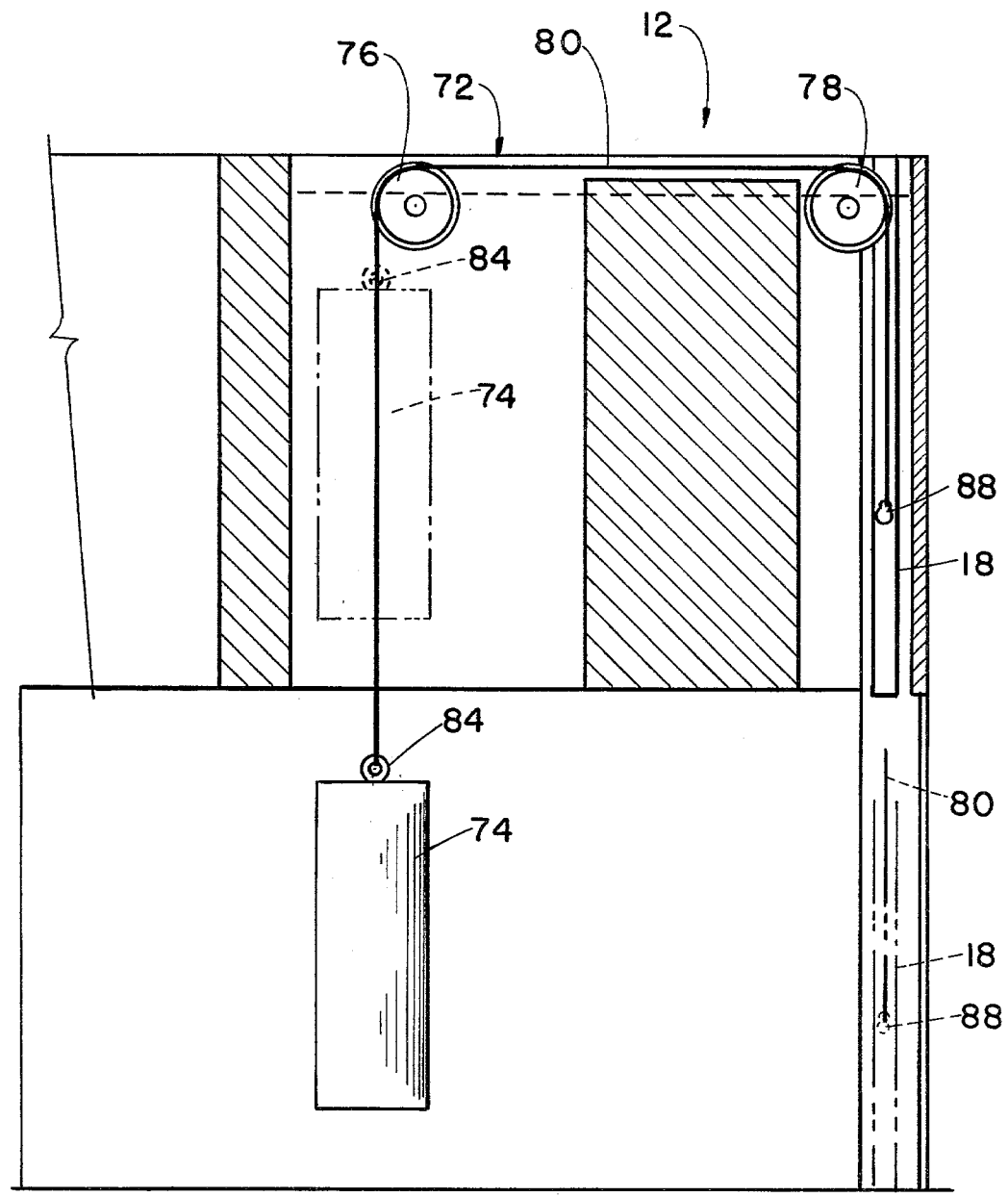
FIG. 7 is a graphic view of a counterbalance mechanism suitable for use with the present invention.

It should be noted that a suitable counterbalance system should be secured to sterilizer 12 to offset the weight of door 18 and closing apparatus 10. A suitable counterbalance system is shown graphically in FIG. 7 and can be adapted for use with sterilizer 12. As can be seen from FIG. 7, a suitable counterbalance system 72 includes a pair of pulleys 76 and 78 secured to sterilizer 12. A cable 80 is disposed in channels (not shown) of pulleys 76 and 78. One end 84 of cable 80 is secured to a weight 74 and the remaining end 88 of cable 80 is secured to door 18. Of course, weight 74 should be chosen to counterbalance the weight of door 18 and closing apparatus 10. If a suitable counterbalance system, such as system 72, is employed with sterilizer 12, door 18 can be moved easily along guides 26 and 28 and will remain where it is positioned by the user.

A description of the operation of closing apparatus 10 follows. Door 18 is moved from its completely open position shown in FIG. 3 to its closed position shown in FIG. 4 by grasping handle 36 of operator 34 and exerting an upward-vertical force on it to slide door 18 along upper guides 26 and lower guides 28. When door 18 reaches its position shown in FIG. 1, door 18 can be moved to its fully closed position by continuing to exert an upward-vertical force on handle 36 until operator 34 and cam members 44 assume the positions shown in FIGS. 4 and 5. Door 18 is moved from its closed position to its fully open position by reversing the procedure described above.

It should be noted that when closing apparatus 10 and door 18 are in their closed positions, and positive pressure of a predetermined value exists within chamber 14, it is not possible to move closing apparatus 10 and door 18 from their closed positions and, accordingly, door 18 is locked in its closed position. Such locking occurs because positive pressure within chamber 14 exerts an outward force on door 18 and, accordingly, traps cam members 44 between door 18 and flanged members 58. When the positive pressure within chamber 14 falls below the predetermined value, door 18 no longer exerts a force on cam members 44 sufficient to prevent the user from withdrawing cam members 44 from between door 18 and flanged members 58 with operator 34.

What is claimed is:

1. Apparatus for closing the door of a chamber capable of maintaining pressure within the chamber comprising:

an operator for moving the door among its closed position, in which pressure can be maintained within the chamber, its partially closed position, in which access cannot be had to the interior of the chamber but in which pressure cannot be maintained within the chamber, and its open position, in which access can be had through the chamber opening to the interior of the chamber and in which pressure cannot be maintained within the chamber;

a guide disposed on the chamber for restricting movement of the door to that necessary for it to travel among its closed, partially closed and open positions;

a member secured to the chamber that is stationary relative to the chamber;

a member disposed on the chamber that is movable relative to the chamber door and capable of being forced by said operator between the door and said stationary member to effect a separation of the door and said stationary member from each other of a predetermined distance to move the door to its closed position; and means disposed on the chamber for preventing the door from moving from its partially closed position toward its closed position until said movable member is forced between said stationary member and the door.

2. The apparatus recited in claim 1 wherein said movable member defines a cam slot with which a portion of said operator cooperates to move said movable member.

3. The apparatus recited in claim 2 wherein said preventing means includes a stop disposed in the door capable of movement, relative to the door, in a direction perpendicular to the plane of the door having a first surface that bears against the perimeter of the chamber opening when the door is in its partially closed position, and a second surface that bears against said movable member when the door is in its partially closed position to prevent the door from moving toward its closed position, said movable member breaking contact with said second surface of said stop when said movable member is forced between the door and said stationary member to permit said movable member to urge the door to its closed position.

4. The apparatus recited in claim 1 wherein the presence of positive pressure of at least a predetermined level within the chamber prevents withdrawal of said movable member from between said stationary member and the door.

5. Apparatus adapted to permit movement of the door of a chamber within which pressure can be maintained to and from its closed, partially closed and open positions and to prevent the door from leaving its closed position, the door being in its closed position when the inner surface of the door is in contact with the perimeter of the chamber opening and pressure can be maintained within the chamber, and being in its partially closed position when its inner surface faces but is spaced from the perimeter of the opening, the door being in its open position when it is in neither its closed nor its partially closed position, said apparatus comprising:

a frame secured to the chamber having a surface facing the exterior surface of the door, the door being in its closed position when said frame surface and the door are separated by a predetermined distance, said frame guiding the door as it moves among its opened, partially closed and closed positions;

a member that is movable relative to the chamber and can be forced between the door and said frame surface when the door is in its partially closed position to separate the door and said frame surface from each other by said predetermined distance and move the door to its closed position;

an operator disposed on the door for cooperating with said movable member to move said movable member; and a stop disposed in said door capable of movement, relative to the door, in a direction perpendicular to the plane of the door having a first surface that bears against the perimeter of the chamber opening and a second surface that bears against said movable member when the door is in its partially closed position to prevent the door from moving toward its closed position, said movable member breaking contact with said second surface of said stop when said movable member is forced between the door and said frame surface to permit said stop to move, relative to the door, toward the exterior of the door and permit said movable member to urge the door to its closed position;

the presence within the chamber of positive pressure of at least a predetermined level preventing removal of said movable member from between said frame surface and the door.

6. Apparatus for controlling movement of the door of a chamber capable of maintaining pressure within the chamber adapted to move in the plane defined by the door between a partially closed position, in which access to the interior of the chamber through the chamber opening is not possible but in which fluid pressure cannot be maintained within the chamber, and an open position, in which access to the interior of the chamber through the chamber opening is possible and in which pressure cannot be maintained within the chamber, and adapted to move in a direction perpendicular to the plane defined by the door between its partially closed position and its closed position, in which pressure can be maintained within the chamber comprising:

an operator for moving the door among its closed, partially closed and open positions;

a guide disposed on the chamber for restricting movement of the door to that necessary for it to travel among said closed, partially closed and open positions;

a member disposed on the chamber that is movable relative to the chamber and capable of being forced by said operator between the door and said guide to separate the door from said guide by a predetermined distance to move the door to its closed position from its partially closed position; and means disposed on the chamber for preventing the door from moving from its partially closed position toward its closed position until said movable member is forced between said guide and the door.

* * * * *